United States Patent [19]

Lamotte et al.

[11] 4,025,406
[45] May 24, 1977

[54] PHOTOCHEMICAL METHOD FOR CHLORINE ISOTOPIC ENRICHMENT

[75] Inventors: Michel Lamotte, Bordeaux, France; Harry J. Dewey, Salt Lake City, Utah; Richard A. Keller, Rockville; Joseph J. Ritter, Mount Airy, both of Md.

[73] Assignee: The United States of America as represented by the Secretary of Commerce, Washington, D.C.

[22] Filed: Jan. 28, 1976

[21] Appl. No.: 652,911

[52] U.S. Cl. .................. 204/157.1 R; 204/158 R; 204/DIG. 11

[51] Int. Cl.$^2$ ........................................... B01J 1/10

[58] Field of Search ............. 250/527; 204/157.1 R, 204/DIG. 11, 158 R

[56] References Cited
OTHER PUBLICATIONS

Karlov, Applied Optics, vol. 13, No. 2 (Feb. 1974) pp. 301–309.
Kuhn et al., Zeitschmift fur Physikalische Chemie, part B, vol. 21 (1933) p. 136.

*Primary Examiner*—Howard S. Williams
*Attorney, Agent, or Firm*—Eugene J. Pawlikowski; Alvin J. Englert

[57] ABSTRACT

An isotopic starting material consisting of a mixture of chlorine-35 and chlorine-37 isotopic species of an isotopic compound having the formula CYClX, wherein Y is O or S and X is Cl or F, such as thiophosgene, is selectively isotopically enriched by means of a laser-induced photochemical reaction between selected chlorine isotopic species in the starting material and a dialkoxyethylene, such as diethoxyethylene. The method is carried out by irradiating with laser radiation, a gaseous mixture at a reduced pressure of the isotopic starting material and the dialkoxyethylene, until a stable reaction product is formed. The wavelength of the radiation is selected so as to selectively excite at least one but less than all of the chlorine isotopic species in the starting material, thereby causing the excited species to preferentially react with the dialkoxyethylene. The resulting reaction product is readily separable from the reaction mixture thereby leaving unreacted isotopic starting material selectively enriched in the unexcited chlorine isotopic species.

10 Claims, No Drawings

PHOTOCHEMICAL METHOD FOR CHLORINE ISOTOPIC ENRICHMENT

BACKGROUND OF THE INVENTION

This invention relates to chlorine isotopic enrichment, and more particularly, to a laser-induced photochemical method for selective chloride isotopic enrichment.

There has been much recent interest in the development of various methods of isotopic separation an enrichment. Although efforts along these lines have primarily been directed to the separation of uranium isotopes for nuclear fuels in the hope of achieving a method more economical than the very expensive ones currently used, pure or enriched isotopes and isotopic compounds of the lighter elements, such as boron and chlorine, are also much needed, for example, as tracer materials for medical research and diagnosis, biological research, and environmental studies.

A number of previously proposed isotopic separation and enrichment methods have utilized laser radiation for selectively exciting particular isotopes or isotope-containing molecules. The selectively excited isotopic species must then be removed before it has a chance to decay back to the ground state or be involved in energy transfer collisions with other isotopic species. Such laser-initiated procedures up to now have been, for the most part, photophysical in nature, wherein one- or multi-photon processes photodissociate molecules or photoionize or deflect atoms, all being unimolecular processes. The principal disadvantage of these photophysical processes has been their inherent overall low efficiency. Although attempts have been made to improve the efficiency of laser-induced isotopic separation and enrichment through the use of photochemical techniques whereby the selectively excited isotopic species is removed by chemical reaction with a reactant added to the system, such attempts heretofore have not resulted in stable reaction products being formed and have failed to achieve appreciable yields of isotopically enriched materials.

Photochemical isotopic enrichment techniques are based on two main phenomena. First, there is the fact that the wavelengths of spectral lines absorbed by a molecule depend somewhat on the isotopes present in the molecule. Second, the rate of a chemical reaction is sometimes influenced by the state of excitation of the participating molecules. Although the precise mechanisms of the latter process are not very well understood, educated guesses can occasionally be made as to which excitations are likely to accelerate a given reaction. In order for photochemical isotopic enrichment to be possible with a given starting material, several conditions must be satisfied. First of all, the effect of isotopic content of the starting material on the wavelengths of one or more of its spectral lines must be large enough so that one type of isotope-containing molecule could be preferentially excited by absorbing laser radiation which would not excite the other type of isotope-containing molecules. Secondly, a laser is needed whose radiation happens to match in wavelength one of the isotope-dependent lines, or a laser that can be tuned to such a wavelength, and the spectral width of the laser radiation must be narrow enough to excite molecules containing one of the isotopes and not the others. Thirdly, the isotope-containing starting compound must be capable of being mixed with other substances with which it is known to react fairly slowly, but which can be made to react more rapidly when one of the isotopic species is selectively excited by the radiation chosen. Fourthly, transfer of excitation from one molecule to another by collisions, and "scrambling" of isotopes through collisions of reaction products with other reactive species (for example, free radicals) present, must be negligible, since both of these factors tend to reduce the selectivity of the overall process.

SUMMARY OF THE INVENTION

It is accordingly a primary object of the present invention to provide a laser-induced photochemical method for chlorine isotopic enrichment in an isotopic starting material containing a mixture of chlorine-35 and chlorine-37 isotopic species, which satisfies all of the aforementioned four conditions.

Another object of the present invention is to provide a laser-induced photochemical method for chlorine isotopic enrichment in accordance with the preceding object, which permits selectivity in the isotopic species to be enriched.

A further object of the present invention is to provide a laser-induced photochemical method for the selective enrichment of either the chlorine-35 or chlorine-37 isotopic content of a starting material containing each of these two isotopes.

Still another object of the present invention is to provide a laser-induced photochemical method for the selective enrichment of chlorine isotopes and/or isotopic species in a chlorine-containing isotopic starting material, wherein the reaction products formed during the course of the process are relatively stable.

Still a further object of the present invention is to provide a laser-induced photochemical method for the selective enrichment of chlorine isotopes and/or isotopic species in a chlorine-containing isotopic starting material, which results in appreciable yields of the isotopically enriched material.

The above and other objects are achieved in accordance with the method of the present invention, in which an isotopic starting material consisting of a mixture of chlorine-35 and chlorine-37 isotopic species of an isotopic compound having the formula CYClX, wherein Y is O or S and X is Cl or F, is selectively isotopically enriched by means of a laser-induced photochemical rection between selected chlorine isotopic species in the starting material and a dialkoxyethylene, such as diethoxyethylene. The method is carried out by forming a gaseous mixture at a reduced pressure in a closed reaction chamber of the chlorine-containing isotopic starting material and the dialkoxyethylene, and irradiating the gaseous mixture with laser radiation. The wavelength of the radiation is selected so as to coincide with the absorption band of at least one but less than all of the chlorine isotopic species in the starting material, thereby selectively exciting the irradiated isotopic species and causing it to preferentially react with the dialkoxyethylene to form a non-volatile reaction product and thus be removed from the gaseous phase. The irradiation of the gaseous mixture is continued for a period of time sufficient to form a significant amount of the non-volatile reaction product and thus to remove from the gaseous phase a significant portion of the irradiated isotopic species. Unreacted isotopic starting material selectively enriched in the unirradiated chlorine isotopic species is recovered from the remaining gaseous phase in the reaction chamber, and constitutes the primary product of the method of the present invention. The non-volatile reaction product formed during the course of the process is relatively stable and is also isotopically enriched, and may be recovered as a secondary product of the method of the present invention.

The method of the present invention results in the recovery of appreciable yields of stable isotopically enriched materials. The primary product resulting from the method of the present invention, i.e., the unreacted isotopic starting material separated from the non-volatile reaction product, will be selectively enriched in one or more of the chlorine isotopic species originally present in the starting material, and generally will furthermore be selectively enriched in one or the other of the chlorine-35 isotope or the chlorine-37 isotope, depending upon the particular isotopic compound employed as the starting material and the particular laser radiation wavelength(s) selected. For example, when the isotopic compound employed as the starting material is CSClF, having only one chlorine atom in its molecule, the starting material will be composed of a mixture of the two chlorine isotopic species, $CS^{35}ClF$ and $CS^{37}ClF$. Selective irradiation of one of these two isotopic species in the method of the present invention will result in the primary product of the method being selectively enriched in the unirradiated isotopic species as well as being selectively enriched in the particular chlorine isotope (chlorine-35 or chlorine-37) of the unirradiated isotopic species. On the other hand, when the isotopic compound employed as the starting material is $CSCl_2$ (thiophosgene), having two chlorine atoms in its molecule, the starting material will be composed of a mixture of the three chlorine isotopic species, $CS^{35}Cl_2$, $CS^{37}Cl_2$ and $CS^{35}Cl^{37}Cl$. Selective irradiation of either one of the first two of these isotopic species of thiophosgene in the method of the present invention will result in the primary product of the method being selectively enriched in the two unirradiated isotopic species as well as being selectively enriched in the particular chlorine isotope (chlorine-35 or chlorine-37) opposite to that of the irradiated isotopic species. However, selective irradiation of both of the two isotopic species of thiophosgene, $CS^{35}Cl_2$ and $CS^{37}Cl_2$, in the method of the present invention, will result in the primary product of the method being selectively enriched in the third isotopic species, $CS^{35}Cl^{37}Cl$.

DESCRIPTION OF PREFERRED EMBODIMENTS

The isotopic compound employed as the starting material in the method of the present invention is a compound having the formula CYClX, wherein Y is O or S and X is Cl or F. Specific examples include $CSCl_2$ (thiophosgene), $COCl_2$ (phosgene) and CSClF. The preferred isotopic starting material is thiophosgene, whose electronic absorption spectrum is known to consist of a series of narrow bands spanning the visible spectral range, with spectra corresponding to isotopic species $CS^{35}Cl_2$, $CS^{35}Cl^{37}Cl$ and $CS^{37}Cl_2$ being clearly resolved with isotopic shifts ranging up to 2 angstroms. Thiophosgene normally has a chlorine-35 isotopic concentration of 75% and a chlorine-37 isotopic concentration of 24.5%.

The reactant employed in the system for reacting with the laser-excited isotopic species and thereby removing it from the gaseous phase, is a dialkoxyethylene of the formula

wherein R and R' are the same or different lower alkyl groups, such as methyl, ethyl, propyl or butyl. The preferred reactant is diethoxyethylene, due to its relatively high reaction rate constant.

In carrying out the method of the present invention, a gaseous mixture of the isotopic starting material and the dialkoxyethylene is formed at a reduced pressure in a closed reaction chamber, for example, a cylindrical cell. The ratio of the partial pressure of the dialkoxyethylene to the partial pressure of the isotopic starting material in the gaseous mixture, and hence the corresponding molar concentration ratio, is not critical and may typically vary from 1 to 3, with the partial pressure of the dialkoxyethylene preferably being about 1.5 torr, and the partial pressure of the isotopic starting material preferably being within the range of from 0.5 to 1.5 torr.

The gaseous mixture is then irradiated with laser radiation. The wavelength of the radiation is selected so as to coincide with the absorption band of at least one but less than all of the chlorine isotopic species in the starting material, thereby selectively exciting the irradiated isotopic species and causing it to preferentially react with the dialkoxyethylene to form a non-volatile reaction product and thus be removed from the gaseous phase. For example, when thiophosgene is used as the isotopic starting material, a tunable dye laser tuned to a wavelength of 4705.5 angstroms, coincides with the absorption band of the $CS^{35}Cl_2$ isotopic species and selectively excites that species of $CSCl_2$ molecules; whereas an argon continuous wave laser at a radiation wavelength of 4657.84 angstroms, coincides with the absorption band of the $CS^{37}Cl_2$ isotopic species and selectively excites that species of $CSCl_2$ molecules. Molecular transition energies for these different isotopic species of $CSCl_2$ molecules differ by from 1 to 10 cm$^{-1}$ and can easily be selectively excited by these laser radiation wavelengths which have line widths of less than 0.3 cm$^{-1}$.

The irradiation of the gaseous mixture is continued for a period of time sufficient for the excited chlorine isotopic species of the starting material to react with the dialkoxyethylene to form a significant amount of the non-volatile reaction product in the reaction chamber and thus to remove from the gaseous phase a significant portion of the irradiated isotopic species. Although this period of time depends somewhat on the laser power, a period of about 4 hours is generally sufficient. The reaction product initially appears as a fog in the reaction chamber, and finally as a liquid on the chamber walls, tiny crystals sometimes being present in the liquid.

The unreacted isotopic starting material recovered as the primary product of the method from the gaseous phase remaining in the reaction chamber is selectively enriched in the unirradiated chlorine isotopic species and generally is furthermore selectively enriched in either the chlorine-35 isotope or the chlorine-37 isotope, the selectivity in the isotopic enrichment being determined by the particular wavelength(s) of laser radiation employed in carrying out the process. For example, when the process is carried out employing thiophosgene as the isotopic starting material and laser radiation having a wavelength of 4705.5 angstroms, thereby selectively exciting the $CS^{35}Cl_2$ isotopic species of $CSCl_2$ molecules, the excited species is caused to preferentially react with the dialkoxyethylene and ultimately form the non-volatile reaction product which is enriched in the chlorine-35 isotope, in which case the unreacted thiophosgene recovered as the primary product from the remaining gaseous phase in the reaction chamber is selectively enriched in the $CS^{37}Cl_2$ and $CS^{35}Cl^{37}Cl$ isotopic species and is furthermore selectively enriched in the chlorine-37 isotope. On the other hand, when the same process is carried out but employing laser radiation having a wavelength of 4657.84 angstroms, thereby selectively exciting the $CS^{37}Cl_2$ isotopic species of $CSCl_2$ molecules, the excited species is caused to preferentially react with the dialkoxyethylene and ultimately form the non-volatile reaction product which is enriched in the chlorine-37 isotope, in which case the unreacted thiophosgene recovered as the primary product from the remaining gaseous phase in the reaction chamber is selectively enriched in the $CS^{35}Cl_2$ and $CS^{35}Cl^{37}Cl$ isotopic species and is furthermore selectively enriched in the chlorine-35 isotope.

Moreover, when the same process is carried out but employing both laser radiation having a wavelength of 4705.5 angstroms and also laser radiation having a wavelength of 4657.84 angstroms, thereby selectively exciting both the $CS^{35}Cl_2$ and $CS^{37}Cl_2$ isotopic species of $CSCl_2$ molecules, both of these excited species are caused to preferentially react with the dialkoxyethylene and ultimately form the non-volatile reaction product, in which case the unreacted thiophosgene recovered as the primary product from the remaining gaseous phase in the reaction chamber is selectively enriched in the $CS^{35}Cl^{37}Cl$ isotopic species.

The method of the present invention lends itself to recycling in order to obtain higher isotopic enrichments. That is, the isotopically enriched primary product resulting from the method of the present invention can be used as a starting material for a repetition of the process. By using several such cumulative stages, each of which increases the relative abundance of one of the isotopes, higher concentrations of that isotope could be obtained.

The method of the present invention is further illustrated by way of the following examples.

EXAMPLE I

A gaseous mixture of thiophosgene having a chlorine-35 isotopic concentration of 75% and a chlorine-37 isotopic concentration of 24.5%, and diethoxyethylene, at a molar ratio of diethoxyethylene to thiophosgene of 1:1, was formed by admitting gaseous thiophosgene at a pressure of 1.5 torr and gaseous diethoxyethylene at a pressure of 1.5 torr to a cylindrical reaction cell 2 centimeters in diameter and 80 centimeters long. The pulsed output from a tunable dye laser pumped by a nitrogen laser, tuned to a wavelength of 4705.5 angstroms, was directed along the 80-centimeter axis of the cell. The average power of the dye laser was approximately 6 mw, and peak powers were approximately 50 kw. Irradiation was carried out for a period of about 4 hours, during which time a reaction product initially appeared as a fog in the reaction cell, and finally as a liquid on the walls of the cell. Another liquid product appeared on the windows of the reaction cell at the place where the laser light entered. This liquid could not be sublimed and appeared to be polymeric in nature. There was no evidence of biphotonic processes initiated by the high peak intensity irradiation. Progress of the reaction at various stages during irradiation was monitored by measuring the total pressure, and the pressure data were used to calculate the quantum efficiency, i.e., probability that a quantum of radiation would be absorbed by a target molecule and lead to the desired reaction. A quantum yield greater than 0.5 was found for the thiophosgene-diethoxyethylene reaction.

The unreacted thiophosgene recovered from the resulting gaseous phase remaining in the reaction cell was analyzed by mass spectroscopy to determine the concentration of isotopic species therein. The results indicated a chlorine-35 isotopic concentration of 64%, a reduction from the 75% chlorine-35 isotopic concentration in the thiophosgene starting material, and hence an enrichment in the chlorine-37 isotope. This material furthermore had become enriched in the two isotopic species, $CS^{37}Cl_2$ and $CS^{35}Cl^{37}Cl$.

EXAMPLE II

The procedure of Example I, above, was repeated, but with the following changes. First of all, the thiophosgene admitted to the cell in forming the starting gaseous mixture was at a pressure of 0.5 torr, thereby providing a molar ratio of diethoxyethylene to thiophosgene of 3:1. Secondly, the gaseous mixture was irradiated with radiation from an argon continuous wave laser whose emission of 4657.84 angstroms happens to substantially coincide with the absorption band of the $CS^{37}Cl_2$ isotopic species of thioposgene. The extinction coefficient for $CSCl_2$ at this wavelength is approximately 5 liter/mole cm. The laser power was 70 mw, and irradiation was again carried out for about 4 hours. As in the preceding example, a reaction product first appeared as a fog in the reaction cell, and then finally as a liquid on the walls of the cell. Also, as in the preceding example, a liquid polymeric product appeared on the windows of the reaction cell at the place where the laser radiation entered.

Mass spectrographic analysis of the resulting unreacted thiophosgene recovered from the gaseous phase remaining in the reaction cell, indicated the product to have a chlorine-37 isotopic concentration of 20%, a reduction from the 24.5% chlorine-37 isotopic concentration of the thiophosgene starting material, and hence an enrichment in the chlorine-35 isotope. This material furthermore had become enriched in the two isotopic species, $CS^{35}Cl_2$ and $CS^{35}Cl^{37}Cl$.

Other isotopic starting materials consisting of a mixture of chlorine-35 and chlorine-37 isotopic species of an isotopic compound having the formula CYClX, wherein Y is O or S and X is Cl or F, such as CSClF, $COCl_2$ and COClF, may similarly be selectively isotopically enriched by means of the laser-induced photochemical method of the present invention, by appropriate selection of the laser radiation wavelength so as to coincide with the absorption band of at least one but less than all of the chlorine isotopic species in the starting material, thereby selectively exciting the irradiated isotopic species and causing it to preferentially react with the dialkoxyethylene to form a non-volatile reaction product and thus be removed from the gaseous phase. In each case, the unreacted isotopic starting material recovered as the primary product of the method from the remaining gaseous phase, will be selectively enriched in the unirradiated chlorine isotopic species and generally will furthermore be selectively enriched in either the chlorine-35 isotope or the chlorine-37 isotope.

While the invention has been described above in its preferred embodiments in terms of the dialkoxyethylene-irradiated isotopic species reaction product being non-volatile and thereby being removed from the gaseous phase, it should be understood that non-volatility of this reaction product is not essential, so long as the reaction product is stable and readily separable from the unreacted isotopic starting material in the reaction mixture. For example, if the reaction were carried out at higher temperatures, the reaction product might be volatilized, but could still be readily separable from the unreacted isotopic starting material. Along these same lines, it should furthermore be understood that the partial pressures and molar concentration ratios described above for the reactants in the starting gaseous mixture are those which are most suitably employed when the reaction is carried out at room temperature, since the vapor pressure of diethoxyethylene is approximately 1.5 torr at room temperature. However, carrying out the reaction at higher temperatures would enable the use of higher dialkoxyethylene partial pressures, e.g., 10 torr or greater, and hence larger molar concentration ratios of dialkoxyethylene to isotopic starting material.

The embodiments of the invention in which an exclusive property or privilege is claimed are defined as follows:

1. A photochemical method for selective chlorine isotopic enrichment in a starting material consisting of a mixture of chlorine-35 and chlorine-37 isotopic species of an isotopic compound having the formula CYClX wherein Y is O or S and X is Cl or F, comprising the steps of:
   a. forming a gaseous mixture at a reduced pressure in a closed reaction chamber of said isotopic starting material and a dialkoxyethylene;
   b. irradiating said gaseous mixture with laser radiation having a wavelength selectively coinciding with the absorption band of at least one but less than all of said chlorine isotopic species, thereby selectively exciting the irradiated isotopic species and causing it to preferentially react with said dialkoxyethylene to form a stable reaction product which is readily separable from the reaction mixture;
   c. continuing said irradiation of said gaseous mixture for a period of time sufficient to form a significant amount of said reaction product in said reaction chamber; and
   d. recovering from the remaining gaseous phase in said reaction chamber unreacted isotopic starting material selectively enriched in the unirradiated chlorine isotopic species.

2. The method of claim 1, wherein the partial pressure of said dialkoxyethylene in said gaseous mixture is 1.5 torr, and the partial pressure of said isotopic starting material in said gaseous mixture is within the range of from 0.5–1.5 torr.

3. The method of claim 1, wherein said dialkoxyethylene is diethoxyethylene.

4. The method of claim 1, wherein said isotopic starting material is thiophosgene consisting of a mixture of chlorine isotopic species comprising $CS^{35}Cl_2$, $CS^{37}Cl_2$ and $CS^{35}Cl^{37}Cl$.

5. The method of claim 4, wherein said irradiation is effected with a tunable dye laser tuned to a wavelength of 4705.5 angstroms, thereby selectively exciting said $CS^{35}Cl_2$ isotopic species and causing it to preferentially react with said dialkoxyethylene, and the unreacted thiophosgene recovered from the resulting gaseous phase in said reaction chamber is selectively enriched in the chlorine-37 isotope and in said $CS^{37}Cl_2$ and $CS^{35}Cl^{37}Cl$ isotopic species.

6. The method of claim 5, wherein said dialkoxyethylene is diethoxyethylene.

7. The method of claim 6, wherein the partial pressure of said diethoxyethylene in said gaseous mixture is 1.5 torr, and the partial pressure of said thiophosgene starting material in said gaseous mixture is 1.5 torr.

8. The method of claim 4, wherein said irradiation is effected with an argon continuous wave laser at a radiation wavelength of 4657.84 angstroms, thereby selectively exciting said $CS^{37}Cl_2$ isotopic species and causing it to preferentially react with said dialkoxyethylene, and the unreacted thiophosgene recovered from the resulting gaseous phase in said reaction chamber is selectively enriched in the chlorine-35 isotope and in said $CS^{35}Cl_2$ and $CS^{35}Cl^{37}Cl$ isotopic species.

9. The method of claim 8, wherein said dialkoxyethylene is diethoxyethylene.

10. The method of claim 9, wherein the partial pressure of said diethoxyethylene in said gaseous mixture is 1.5 torr, and the partial pressure of said thiophosgene starting material in said gaseous mixture is 0.5 torr.

* * * * *